(12) United States Patent
Parsons et al.

(10) Patent No.: US 9,167,499 B2
(45) Date of Patent: *Oct. 20, 2015

(54) UBIQUITOUS ACCESS TO FEMTO-CONNECTED NETWORK

(71) Applicant: Apple Inc., Cupertino, CA (US)

(72) Inventors: Eric W. Parsons, Stittsville (CA);
Philippe Reininger, Paris (FR); Saso Stojanovski, Paris (FR); Barnaba Barnowski, Calgary (CA)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/511,289

(22) Filed: Oct. 10, 2014

(65) Prior Publication Data

US 2015/0055598 A1 Feb. 26, 2015

Related U.S. Application Data

(63) Continuation of application No. 13/868,536, filed on Apr. 23, 2013, which is a continuation of application No. 12/935,827, filed as application No. PCT/CA2009/000559 on Apr. 29, 2009, now Pat. No. 8,446,863.

(60) Provisional application No. 61/048,721, filed on Apr. 29, 2008.

(51) Int. Cl.
*H04W 4/00* (2009.01)
*H04W 40/20* (2009.01)
(Continued)

(52) U.S. Cl.
CPC .............. *H04W 40/20* (2013.01); *H04L 45/72* (2013.01); *H04W 40/02* (2013.01); *H04W 80/04* (2013.01);
(Continued)

(58) Field of Classification Search
USPC ........ 370/328, 329, 332, 331, 337, 338, 347, 370/352, 354; 455/456.1, 439, 426.2, 434, 455/432.1
See application file for complete search history.

(56) References Cited

U.S. PATENT DOCUMENTS 7,535,890 B2 5/2009 Rojas
7,808,947 B2 10/2010 Iyer
(Continued)

FOREIGN PATENT DOCUMENTS

EP 1622314 2/2006
WO 2007040449 4/2007

OTHER PUBLICATIONS

Office Action from Korean Application No. 10-2014-7027795, issued Dec. 29, 2014, Korean and English versions, pp. 1-5.
(Continued)

*Primary Examiner* — Chi H Pham
*Assistant Examiner* — Alexander O Boakye
(74) *Attorney, Agent, or Firm* — Meyertons, Hood, Kivlin, Kowert & Goetzel, P.C.

(57) ABSTRACT

A system and method of enabling a mobile device to communicate with a local IP network host and an external IP network host using a femto cellular access point on a femto cellular access network. A local gateway is coupled to the femto cellular access network for receiving data packets transmitted on the femto cellular access network and for routing the data packets to one of a local IP network and an external IP network, based on a destination address associated with the data packets. The femto cellular access network includes an LTE network, an EVDO network connected to an EPC, or a WiMax 802.16e/m network connected to the EPC.

20 Claims, 3 Drawing Sheets

(51) Int. Cl.
  *H04W 80/04* (2009.01)
  *H04W 88/16* (2009.01)
  *H04W 40/02* (2009.01)
  *H04L 12/721* (2013.01)
  *H04W 88/08* (2009.01)
  *H04W 84/04* (2009.01)
  *H04W 92/02* (2009.01)
  *H04W 88/02* (2009.01)

(52) U.S. Cl.
  CPC .............. *H04W 88/08* (2013.01); *H04W 88/16* (2013.01); *H04W 84/045* (2013.01); *H04W 88/02* (2013.01); *H04W 92/02* (2013.01)

(56) References Cited

U.S. PATENT DOCUMENTS

| | | | |
|---|---|---|---|
| 7,925,259 | B2 | 4/2011 | Nylander et al. |
| 8,446,863 | B2* | 5/2013 | Parsons et al. ............... 370/328 |
| 2005/0135333 | A1 | 6/2005 | Rojas |
| 2006/0098614 | A1 | 5/2006 | Moon et al. |
| 2007/0136412 | A1 | 6/2007 | Oba et al. |
| 2007/0238448 | A1 | 10/2007 | Gallagher et al. |
| 2007/0243872 | A1 | 10/2007 | Gallagher et al. |
| 2007/0293222 | A1 | 12/2007 | Vikberg et al. |
| 2008/0096553 | A1 | 4/2008 | Saksena et al. |
| 2008/0318571 | A1 | 12/2008 | Vikberg et al. |

OTHER PUBLICATIONS

Notice of Allowance from Korean Application No. 10-2010-7024245, issued Feb. 26, 2015, English and Korean versions, pp. 1-7.
Notice of Allowance from Korean Application No. 10-2014-7008760, issued Feb. 27, 2015, English and Korean versions, pp. 1-8.
Office Action from Korean Application No. 1020147027794, issued Jan. 27, 2015, English and Korean versions, pp. 1-13.
U.S. Appl. No. 13/868,536, filed Apr. 23, 2013, Eric W. Parsons.
Extended European Search Report from Application No. PCT/CA2009/000559, dated May 9, 2014, Apple Inc., pp. 1-9.
International Search Report and Written Opinion dated Aug. 4, 2009 for International Application No. PCT/CA2009/000559, Aug. 4, 2009, pp. 1-11.
Office Action in related Chinese Application No. 200980115909.9, issued Nov. 22, 2012, pp. 1-8.

* cited by examiner

UBIQUITOUS ACCESS TO FEMTO-CONNECTED NETWORK

CROSS-REFERENCE TO RELATED APPLICATIONS

This application is a continuation of U.S. patent application Ser. No. 13/868,536, filed on Apr. 23, 2013, which is a continuation of U.S. patent application Ser. No. 12/935,827, filed on Sep. 30, 2010, which is a submission Under 35 U.S.C. §371 for U.S. National Stage patent application of international application no. PCT/CA2009/000559, filed Apr. 29, 2009 entitled "UBIQUITOUS ACCESS TO FEMTO-CONNECTED NETWORK," which claims priority to U.S. provisional application Ser. No. 61/048,721, filed Apr. 29, 2008, all of which are incorporated herein by reference as if set forth in their entireties.

FIELD OF THE INVENTION

This invention relates to femto cell networks, and more particularly to a system and method of granting user equipment access to in-home electronic devices that are coupled to the femto cell, both while the user equipment is operating within the femto cell and while the user equipment is operating outside the femto cell.

BACKGROUND OF THE INVENTION

Wireless carriers employ cellular towers to generate large cells for wireless communications over vast physical areas, such as metropolitan or rural areas. The large cells or macro cells may cover areas of 1 km to 5 km in diameter. A cellular tower broadcasts wireless signals to and receives wireless signals from user equipment or mobile handsets that are located throughout the macro cells.

Various structures are located within the macro cell that obstruct, reflect or otherwise interfere with the wireless signals. For example, users typically attempt to use mobile devices inside structures such as homes and commercial establishments, among other structures. These structures may be constructed of high loss material, such as concrete or metal that block wireless signals from penetrating the structures. Reception within these structures is often poor and unreliable due to weak wireless signal strength. Poor reception is associated with inferior quality of service by the mobile user. Femto cells or micro cells are located within these high loss structures to route signal transmissions through existing broadband backhaul infrastructure to the macro network. What is desired are systems and methods of allowing multiple devices, such as cellular and network devices, that are located within the femto cell to communicate with each other while the user equipment is located within the femto cell or while the user equipment is located outside the femto cell. Additionally, what is desired are systems and methods of allowing the user equipment to communicate with home-based devices, such as data storage devices, printing devices or other devices.

SUMMARY OF THE INVENTION

The invention advantageously provides a method and system for allowing multiple devices that are coupled through a femto cell, such as user equipment and network terminal devices, to communicate with each other while the user equipment is located within the femto cell or while the user equipment is located outside the femto cell. The invention also allows the user equipment to communicate with home-based devices, such as data storage devices, printing devices or other devices.

A system is provided for enabling a mobile device to communicate with a local IP network host and an external IP network host using a femto cellular access point on a femto cellular access network. The system includes a local gateway that is coupled to the femto cellular access network and receives data packets transmitted on the femto cellular access network. The data packets are routed a local IP network or an external IP network based on a destination address associated with the data packets.

A system is also provided for enabling a mobile device that is coupled to a macro cellular network to communicate with a local IP network using a femto cellular access network through a macro cellular access network. A local gateway is provided to receive data packets that are transmitted on the macro cellular access network and to routes the data packets to terminal devices that are coupled to a local IP network.

A method is provided for using a femto cell to facilitate communications between a mobile device and at least one terminal device. The method includes assigning a local internet protocol address to a local gateway and receiving data packets transmitted by a mobile device at the local gateway. The data packets are analyzed to identify a local destination address and are routed to the at least one terminal device. The data packets are maintained in a local network without transmitting data packets to a core gateway.

BRIEF DESCRIPTION OF THE DRAWINGS

A more complete understanding of the invention, and the attendant advantages and features thereof, will be more readily understood by reference to the following detailed description when considered in conjunction with the accompanying drawings wherein.

DETAILED DESCRIPTION OF THE INVENTION

Figure 1:
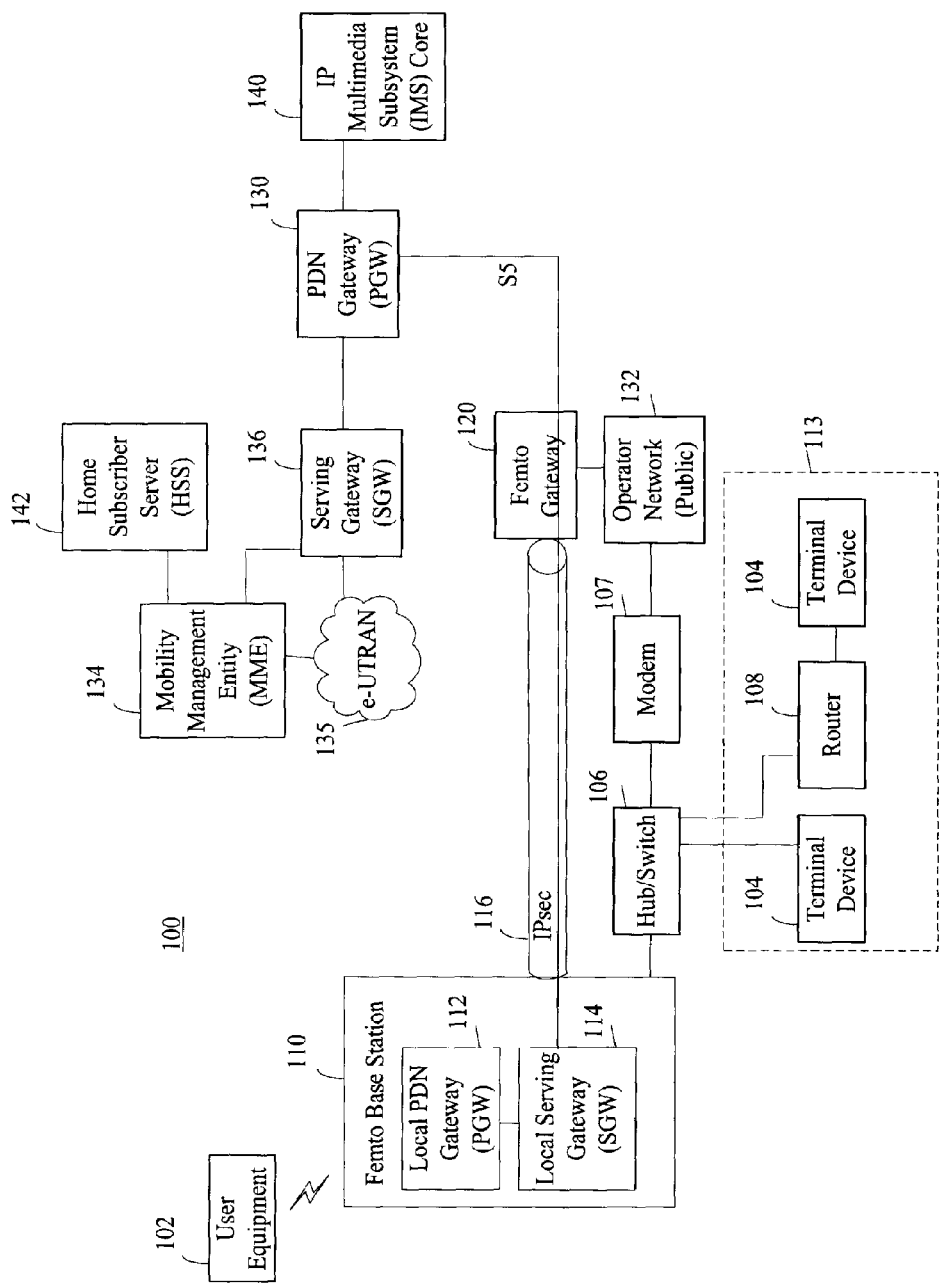
FIG. 1 illustrates a block diagram of the an in-home local breakout network architecture constructed in accordance with the principles of the invention.

The invention provides femto base stations or home evolved Node-B devices that are positioned inside structures to improve cellular quality of service and facilitate communications with devices coupled to a home network. For example, the femto base stations may be positioned inside residential or commercial structures, among other structures. The femto base stations may operate in the femto power range of about +15 dBm and may provide an operation range of approximately 50 meters.

The femto base stations communicate with user equipment ("UE"), such as cellular telephone, personal digital assistants, or other UE over wireless cellular technologies. The femto base stations may use existing broadband backhaul infrastructure to access networks, such as the Internet and/or macro networks, through the publicly-switched telephone network. The femto base stations may be coupled to digital subscriber line ("DSL") devices or cable modems and to local area networks ("LANs").

The invention may operate using existing cellular technologies, such as CDMA2000 1xRTT, evolution-data optimized ("EV-DO") and long-term evolution ("LTE") networks, among other cellular networks.

The UE 102 may include a wide range of electronic devices, including but not limited to mobile phones, personal data assistants ("PDA") and similar devices, which use the various communication technologies such as advanced mobile phone system ("AMPS"), time division multiple access ("TDMA"), code division multiple access ("CDMA"), global system for mobile communications ("GSM"), general packet radio service ("GPRS"), 1x evolution-data optimized (abbreviated as "EV-DO" or "1xEV-DO") and universal mobile telecommunications system ("UMTS"). The UE 102 also include hardware and software suitable to support the control plane functions needed to engage in wireless communication with the femto base stations and enhanced nodes ("eNB"). Such hardware can include a receiver, transmitter, central processing unit, storage in the form of volatile and nonvolatile memory, and input/output devices, among other hardware.

The invention is directed to deploying a plurality of femto cells within a macro cell environment. While the various femto base stations are components of the overall communications network, each femto cell is separate and distinct from the existing macro cell and any adjacent femto cells. During mobility, the system hands UE communication sessions from a femto cell to the macro cell, or vice versa. Alternatively, the system may hand UE communication sessions from a femto cell to another femto cell.

According to one embodiment, the macro cells and the femto cells employ handoff procedures that are initiated when signal strength measurements originating in the active network, such as the cellular network or the femto network, fall below pre-selected threshold parameters. The UE 102 may detect the weak signal strength emanating from the "active" access network and may initiate a handoff to the "idle" access network, such as the femto base station network or the cellular network, having a stronger signal strength, by reporting the weak signal to the active access network.

Alternatively, the handoff procedures may be initiated to off-load terminal device traffic from the cellular network to the femto base station network. The femto base station is a personal and dedicated base station for each corresponding structure, such as a home or commercial building. The femto base stations independently support network traffic, along with the cellular network that supports the macro cell.

The femto base station 110 may be directly or indirectly coupled to a hub/switch 106, DSL/cable modem 107 and/or router 108. These devices may include separate hardware devices or a combination of hardware devices. The hub/switch 106 and router 108 may be provided to share system resources, such as terminal devices 104, with the UE 102. The terminal devices 104 may include personal computers, laptops, printers, and media players, among other terminal devices.

The invention provides femto base stations 110 having a local PDN Gateway ("PGW") 112 with a home access point name ("APN") and a serving gateway ("SGW") 114 that directs in-home data requests to terminal devices 104 that are coupled to a local area network 113. A single access point name may be assigned to a plurality of subscribers and may be resolved to a target local PGW 112. Alternatively, a plurality of access point names may be assigned to a plurality of subscribers.

Long-term evolution ("LTE") and evolved high rate packet data ("eHRPD") are exemplary 4G technologies that improve the universal mobile telecommunications system ("UMTS") mobile telephone standard by providing a simplified, all-packet architecture. The UMTS technology supports mobile Internet protocol ("IP") services, such as music downloads, video sharing, voice over IP broadband access, and other IP services to laptops, personal digital assistants ("PDAs") and other terminal devices 104. The LTE enhances current UMTS capabilities by providing improved efficiency, lower costs, increased peak data rates, lower latency, improved services and improved integration with other open standards. The invention further supports femto cellular access networks, including an LTE network, an EVDO or evolved high rate packet data (eHRPD) network connected to an evolved packet core ("EPC"), WiMax 802.16e/m connected to EPC.

It should be appreciated that, although the invention is described with reference to the LTE network, the principles of the invention may be adapted by one of skill in the art to include other networks, such as WiMAX (802.16) networks, other CDMA2000 networks and any other networks known in the art or later developed.

Referring now to the drawing figures in which like reference designators refer to like elements, FIG. 1 illustrates an exemplary block diagram of a system designated generally as "100" that includes user equipment 102 that operates on cellular technology and terminal devices 104 that operate on a local area network within a femto cell range. The invention enables the UE 102 to access the terminal devices 104 that are located within the femto cell range. The UE 102 may be assigned a local area IP address. The femto base station 110 includes a local packet data network ("PDN") Gateway ("PGW") 112 having a home access point name ("APN") and a local serving gateway ("SGW") 114 that routes in-cell data requests to an in-home LAN 113. The 'home-based' PDN or local PGW 112 permits the UE 102 to attach to terminal devices 104 on the local area network 113.

Local PGW 112 provides direct connectivity between the UE 102 and terminal devices 104 that are connected to the home LAN 113 through the femto base station 110. For example, the UE 102 may be directly connected to terminal devices 104, including a printer, media player, a display device or other terminal devices. The local PGW 112 and the local SGW 114 may eliminate the need to send data from the UE 102 across to operator's macro network 132. As a result, Internet traffic may be off-loaded from a service provider's wireless network to the backhaul IP infrastructure. The femto base station 110, the local PGW 112 and the local SGW 114 may be configured to enable the UE 102 to access one or more packet data networks ("PDN") concurrently through one or more local PGWs 112.

To support this capability, in addition to supporting a home or local SGW 114 and local PGW 112, the femto base station 110 supports the S5 and S11 interface, among other interfaces. The femto gateway ("GW") 120, in addition to aggregating the S1-MME interface, also may be enhanced to support S11 and S5 aggregation.

The femto base stations 110 may include a central processing unit ("CPU"), transmitter, receiver, I/O devices and storage, such as volatile and nonvolatile memory, to implement the functions described herein. The femto base stations 110 may communicate with the UE 102 over a radio interface.

The femto base station 110 is coupled to the femto GW 120 through IPsec tunnel 116. IPsec tunnel 116 provides a secure public network connection and preventing wiretapping, traffic manipulation or other security threats. The femto GW 120 is an interface to external networks and may be coupled to a plurality of femto base stations 110. For example, the femto GW 120 may be coupled to and may manage hundreds or thousands of femto base stations 110. Additionally, the femto GW 120 may be configured as an authenticator that grants local breakout authorization.

According to one embodiment, a mobility management entity ("MME") 134 may be provided as a control plane entity to manage the UE 102 within the LTE network to authenticate the UE 102. The MME 134 may be connected to the femto base station 110. The MME 134 is a signaling only entity, such that IP data packets that originate from the UE 102 are not processed at the MME 134. The MME 134 may perform various functions, including non-access stratum ("NAS") signaling; NAS signaling security; tracking area list management for mobile terminals in idle and active mode; packet data network gateway ("PDN-GW") selection and serving gateway ("S-GW") selection; roaming; authentication; and bearer management functions; among other functions.

The femto GW 120 communicates with packet data network gateway ("PDN GW") or ("PGW") 130. The communication may be performed using an S5 reference point, among other interfaces. PGW 130 provides the UE 102 with access to one or more PDN concurrently through one or more PGWs 130. The PGW 130 provides an anchor point for the UE 102 and remains in communication with the UE 102 throughout a communication session, regardless of whether the UE 102 moves to different network nodes. The PGW 130 is configured not to receive data that is transmitted using the femto base station 110 between the UE 102 and in-home terminal devices 104. External Internet traffic may be routed to the terminal devices 104 through the in-home or local PGW 112 or the PGW 130, based on operator decision. The PGW 130 may perform various functions, including packet filtering on a per-user basis; interception; mobile terminal IP address allocation; uplink ("UL") and downlink ("DL") service level charging, gating and rate enforcement; and transport level packet marking in the downlink; among performing other functions. Additionally, the PGW 130 may manage mobility between 4G networks and non-4G networks.

A serving gateway ("SGW") 136 may be coupled to an evolved UMTS terrestrial LAN (e-UTRAN) and the MME 134 to manage packet forwarding uplink and downlink between the PGW 130 and the e-UTRAN environment. The SGW 136 may perform various functions, including being a local mobility anchor point for inter-eNB handoffs; mobility anchoring for inter-4G mobility; interception; packet routing and forwarding; transport level packet marking in the uplink and downlink; uplink and downlink per mobile terminal, PDN and quality of service class identifier ("QCI"); and accounting on user and QCI granularity for inter-operator charging; among performing other functions. An IP multimedia subsystem ("IMS") core 140 may be coupled to the PGW 130 to handle calls or sessions, real-time session negotiation and management. A home subscriber server ("HSS") may be coupled to the MME 134 to maintain a physical location of the user. The HSS may be implemented with a master database having subscription and location information.

Figure 2:
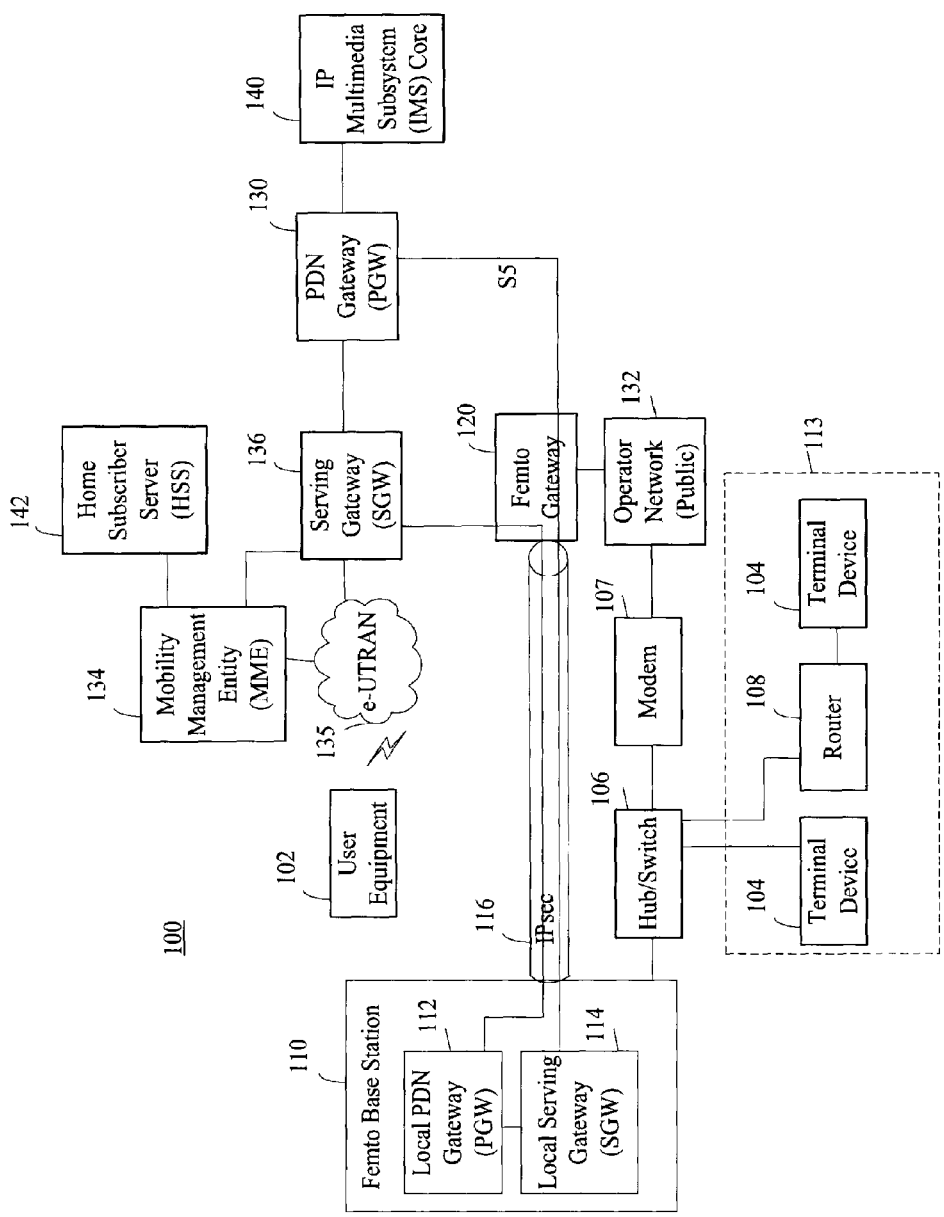
FIG. 2 illustrates a block diagram of the an away-from-home remote access to a home-based network architecture constructed in accordance with the principles of the invention.

FIG. 2 illustrates a schematic block diagram of a system for enabling the UE 102, which is located at a remote location, to communicate with in-home terminal 104 devices. The invention enables users to access the home network 113 while connected to the macro network. Additional PDN connectivity enables the user to specify a home PDN as a target PDN. The SGW 136 on the macro network creates an S5 tunnel to the user's home PDN and provides the UE 102 with access to the terminal devices 104 on the local network. The components of FIG. 2 are the same as the components of FIG. 1, with FIG. 2 including a communications path from the SGW 136 to the femto GW 120 in order to facilitate routing of a request to the local PGW 112. The UE 102 communicates with the e-UTRAN 135 in the macro network, where the UE 102 is authenticated and a data packet is forwarded to the SGW 136. The SGW 136 analyzes the data packet from the UE 102 and determines whether to direct the received data to the local or home-based PGW 112 through the femto GW 120. The UE 102 may acquire an IP address for itself on both the remote network and the local or home-based network 113 through, for example, a dynamic host configuration protocol ("DHCP") or another address management protocol. The femto GW 120 may direct the data packets to the local or home-based PGW 112. The local PGW 112 may send the data packets to the in-home LAN 113 for distribution to target in-home terminal devices 104.

Figure 3:
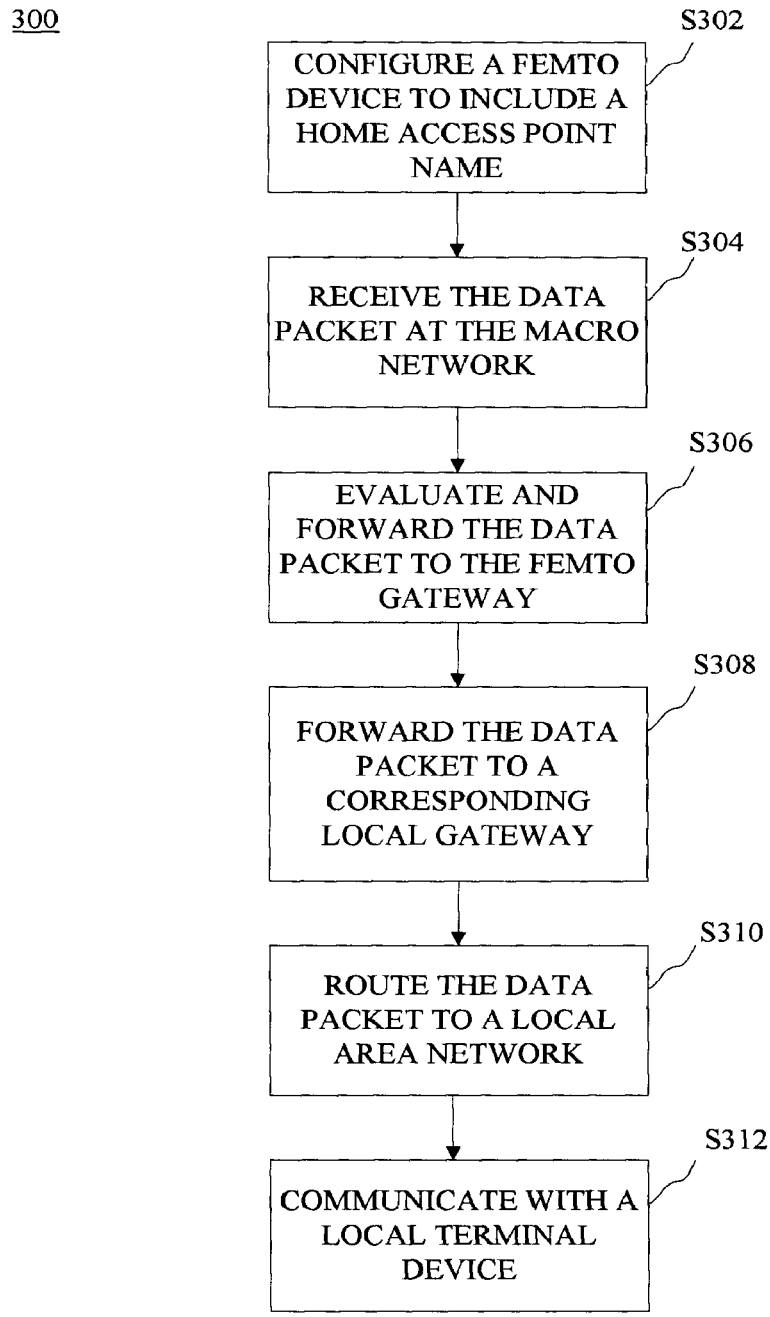
FIG. 3 illustrates a flow chart for performing a femto cell local breakout in accordance with the principles of the invention.

FIG. 3 illustrates an exemplary flow diagram for performing local breakout at the femto base station 110. A femto base station is configured to include a home access point name in step S302. Receive a data packet at the macro network in step S304. Evaluate the data packet at the mobility management entity and forward the data packet to the femto GW at step S306. Forward the data packet to a corresponding local PGW at step S308. Route the data packet to an in-home breakout device at step S310. Communicate with an in-home device in step S312.

It should be appreciated that, although the invention is described with reference to the LTE network, the principles of the invention may be adapted by one of skill in the art to migrate between any networks, including other networks, such as 1xRTT networks, EV-DO networks, UMTS networks, WiMAX (802.16) networks, other CDMA2000 networks and any other networks known in the art or later developed.

The present invention can be realized in hardware, software, or a combination of hardware and software. Any kind of computing system, or other apparatus adapted for carrying out the methods described herein, is suited to perform the functions described herein.

A typical combination of hardware and software could be a specialized computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

The invention claimed is:

1. A femto cellular access point configured to enable a mobile device to communicate with a local IP network and an external IP network, comprising:
   communication circuitry for performing communication with one or more mobile devices, the local IP network, and the external IP network;
   processing hardware coupled to the communication circuitry, wherein the processing hardware is configured to:
   receive data packets transmitted by a first mobile device;
   determine a destination address associated with the data packets, wherein determining the destination address comprises determining whether the destination address is a local address or an external address; and
   route the data packets to one of the local IP network and the external IP network, based on whether the destination address is a local address or an external address.

2. The femto cellular access point of claim 1, wherein determining the destination address comprises determining that the destination address is a local address, and wherein routing the data packets comprises routing the data packets to the local IP network instead of the external IP network.

3. The femto cellular access point of claim 2, wherein the destination address is of a terminal device coupled to the local IP network.

4. The femto cellular access point of claim 3, wherein the terminal devices include at least one of a media player, a printer, a computer and a data storage device.

5. The femto cellular access point of claim 2, wherein routing the data packets comprises routing the data packets to a router of the local IP network.

6. The femto cellular access point of claim 1, wherein determining the destination address comprises determining that the destination address is an external address, and wherein routing the data packets comprises routing the data packets to the external IP network.

7. The femto cellular access point of claim 6, wherein routing the data packets comprises routing the data packets to a core gateway provided at the external IP network.

8. The femto cellular access point of claim wherein the femto cellular access point provides an LTE network.

9. A method for enabling a mobile device to communicate with a local IP network and an external IP network, comprising:
   at a femto cellular access point:
   receiving data packets transmitted by a first mobile device;
   determining a destination address associated with the data packets, wherein determining the destination address comprises determining whether the destination address is a local address or an external address; and
   routing the data packets to one of the local IP network and the external IP network, based on whether the destination address is a local address or an external address.

10. The method of claim 9, wherein determining the destination address comprises determining that the destination address is a local address, and wherein routing the data packets comprises routing the data packets to the local IP network instead of the external IP network.

11. The method of claim 10, wherein the destination address is of a terminal device coupled to the local IP network.

12. The method of claim 11, wherein the terminal devices include at least one of a media player, a printer, a computer and a data storage device.

13. The method of claim 10, wherein routing the data packets comprises routing the data packets to a router of the local IP network.

14. The method of claim 9, wherein determining the destination address comprises determining that the destination address is an external address, and wherein routing the data packets comprises routing the data packets to the external IP network.

15. The method of claim 14, wherein routing the data packets comprises routing the data packets to a core gateway provided at the external IP network.

16. The method of claim 9, wherein the femto cellular access point provides an LTE network.

17. A non-transitory, computer accessible memory medium storing program instructions for enabling a mobile device to communicate with a local IP network and an external IP network, wherein the program instructions, when executed by a processor of a femto cellular access point, cause the femto cellular access point to perform a method comprising:
   receiving data packets transmitted by a first mobile device;
   determining a destination address associated with the data packets, wherein determining the destination address comprises determining whether the destination address is a local address or an external address; and
   routing the data packets to one of the local IP network and the external IP network, based on whether the destination address is a local address or an external address.

18. The non-transitory, computer accessible memory medium of claim 17, wherein determining the destination address comprises determining that the destination address is a local address, and wherein routing the data packets comprises routing the data packets to the local IP network instead of the external IP network.

19. The non-transitory, computer accessible memory medium of claim 18, wherein the destination address is of a terminal device coupled to the local IP network.

20. The non-transitory, computer accessible memory medium of claim 17, wherein determining the destination address comprises determining that the destination address is an external address, and wherein routing the data packets comprises routing the data packets to the external IP network.

* * * * *